Nov. 12, 1929.            L. K. BRAREN            1,735,231
                     SCREW SLOTTING MECHANISM
                       Filed Oct. 6, 1924           2 Sheets-Sheet 1
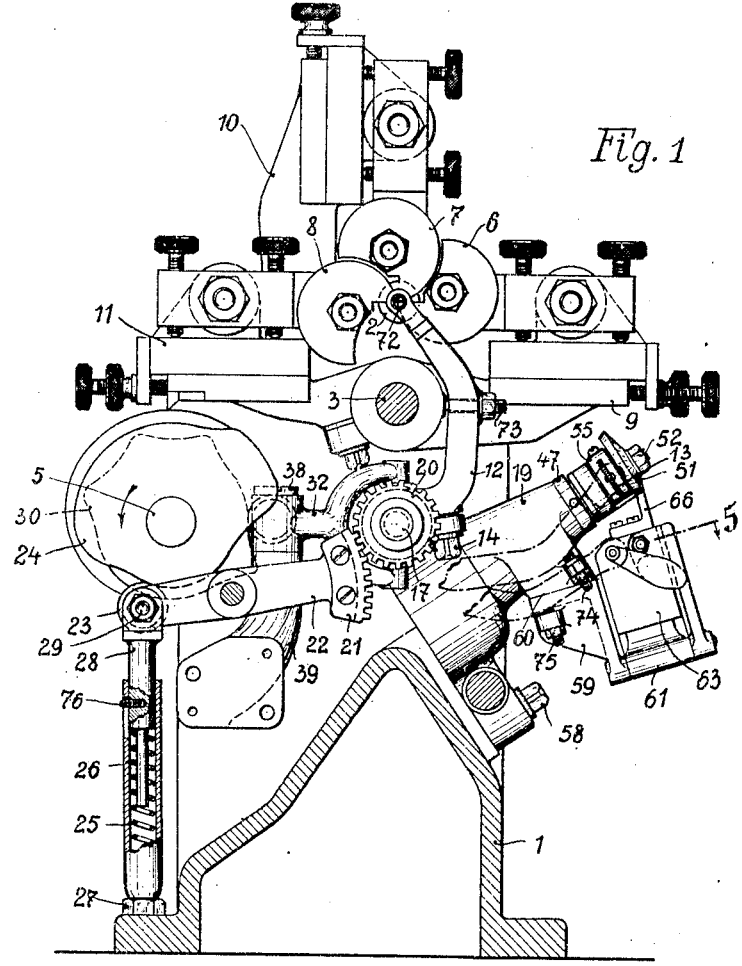
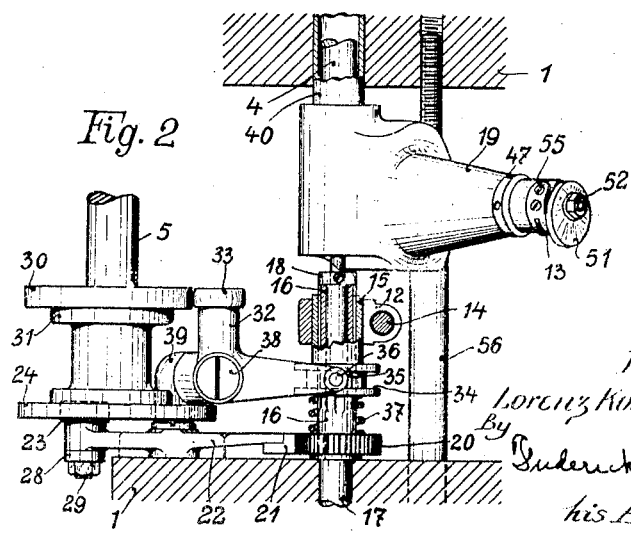

Nov. 12, 1929.     L. K. BRAREN     1,735,231
SCREW SLOTTING MECHANISM
Filed Oct. 6, 1924     2 Sheets-Sheet 2
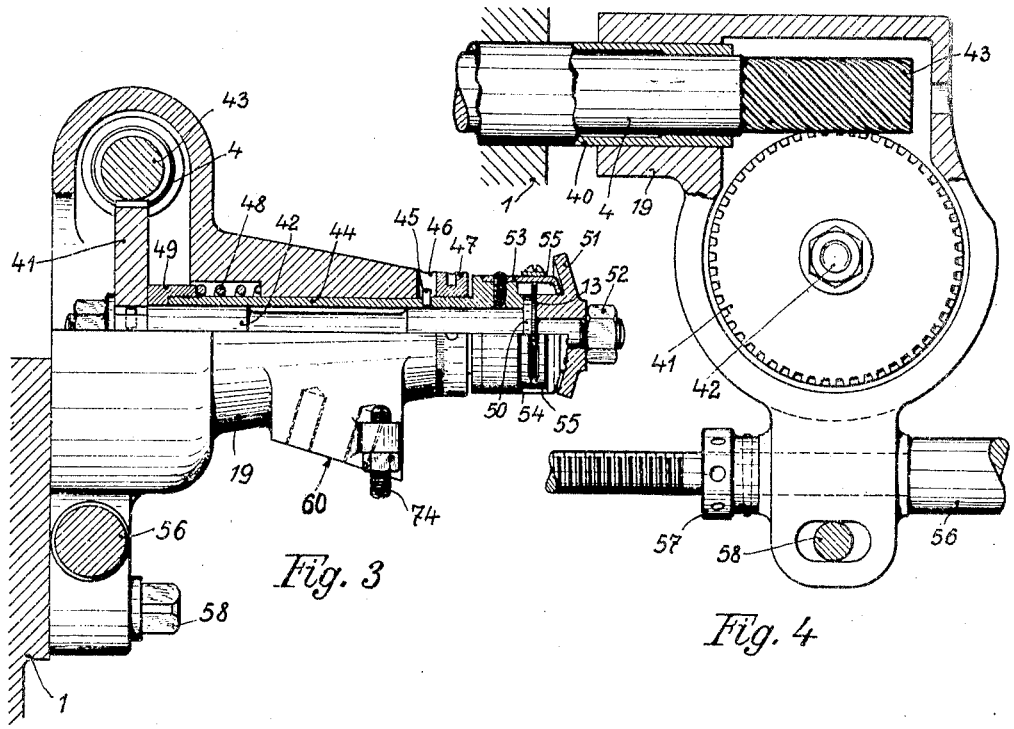
Fig. 3
Fig. 4
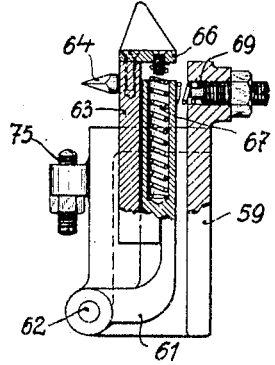
Fig. 6
Fig. 7
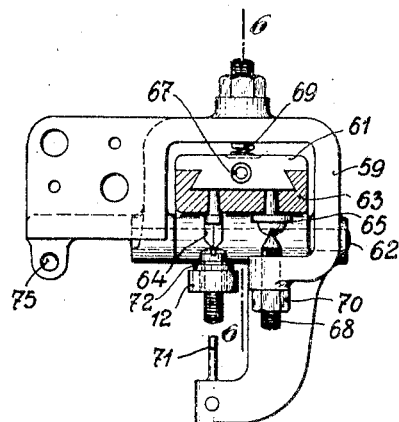
Fig. 5
Inventor
Lorenz Konrad Braren
By Frederick S. Church
his Attorney Patented Nov. 12, 1929

1,735,231

UNITED STATES PATENT OFFICE

LORENZ KONRAD BRAREN, OF MUNICH, GERMANY, ASSIGNOR TO THE FIRM FRIEDRICH DECKEL, FABRIK FÜR PRÄZISIONSMECHANIK UND MASCHINENBAU, OF MUNICH, GERMANY

SCREW-SLOTTING MECHANISM

Application filed October 6, 1924, Serial No. 741,913, and in Germany October 26, 1923.

The present invention relates to screw slotting mechanisms and the object of my invention is to provide an improved mechanism for producing slots or incisions in the heads of screws or similar parts and for working automatically in conjunction with an automatic screw machine.

A further object is to provide improved means for driving and adjusting the slotting saw and for carrying the parts after they have been finished otherwise from the bar of material to the slotting saw.

Another object of my invention is to provide a device for removing any burs formed by the slotting saw, to perform this operation right after slotting in the same cycle of operations and to arrange the part carrier to move the piece from the slotting saw to the shaving tool and to the removing device.

In the drawings accompanying and forming part of this specification

Figure 1 is a cross section through an automatic screw machine with my invention applied thereto;

Figure 2 is a part sectional plan of Figure 1 showing the slotting mechanism;

Figure 3 is a side view of the drive for the slotting saw, partly in section on an enlarged scale;

Figure 4 is an end elevation of the drive shown in Figure 3 partly in section;

Figure 5 is a sectional plan of the bur removing device on an enlarged scale according to line 5—5 of Figure 1;

Figure 6 is a vertical section taken on lines 6—6 of Figure 5;

Figure 7 is a cross section of the shaving tool on an enlarged scale.

In bearings of a frame 1 of the automatic screw machine there are journaled several parallel shafts, a main spindle 2, a main driving shaft 3, a shaft 4 for driving the slotting saw, and a cam shaft 5. These shafts are connected together by gearing or by other convenient driving means not shown. Cutting tools 6, 7 and 8 are mounted on carriers 9, 10 and 11 respectively and may be brought into engagement with a bar of material passing through the hollow main spindle 2 in well known manner. A carrier 12 for taking the pieces otherwise finished from the bar of material to a slotting saw 13 is clamped by a screw 14 to a sleeve 15, which is slidably mounted on a bushing 16 on which it is splined to prevent it from rotating thereon. The bushing 16, mounted rotatably on a stud 17, is held against axial movement by a collar 18 fastened to a reduced portion of the stud 17. The latter is arranged coaxial with the shaft 4; one end is pushed with a tight fit into a wall of the frame 1, while the other end is supported in a bore of a frame or housing 19 containing the drive for the slotting saw 13. A gear 20 fixed to or forming an integral part of the bushing 16 stands in engagement with a toothed segment 21 which is fastened to a lever 22. The latter is pivoted to the frame 1 and carries at the other end a roller 23 which is held in engagement with a cam 24 by a spring 25. This spring is located in a housing 26 which rests with one ball shaped end in a corresponding socket of the screw 27. A spring plunger 28 fits slidingly with one end in the bore of the spring housing 26 while the other end is pivoted to turn freely on the stud 29 carrying a roller 23. A set screw 76 is screwed into the plunger 28 and passes through a slot in the housing 26, preventing thus the dropping off of the housing from the plunger when the housing is raised from the socket in the screw 27. A swinging movement of the carrier 12 is produced when turning the cam 24. When setting the cutting tools it is very undesirable to have the carrier 12 swing regularly into the path of the bar of material and this may be prevented readily by pulling the lower end of the housing 26 rearwardly to remove it from the socket 27. Gravity then operates the lever 22 and removes the roller 23 from the cam, and the carrier 12 then drops into the dotted position shown in Figure 1.

A reciprocating movement of the carrier 12 is effected by a cam 30 fastened to a holder 31, which also carries the cam 24. The holder 31 is fastened to and rotates with the cam shaft 5. A bell crank 32 carries on one end a roller 33 in engagement with the cam 30 while the other end is shaped like a fork to extend over and under a groove 34 provided in the sleeve 15. Two guide shoes 35 fitting into the groove 34 are held by shoulder pins 36 to the arms of the fork. A spring 37 exerts a constant pressure against the sleeve 15 holding in this manner the roller 33 against the cam 30. The bell crank lever 32 is pivoted on a stud 38 which is screwed into a bracket 39 fastened to a seat of the frame 1.

The shaft 4 for driving the slotting saw has at the front end a bearing in a tube 40 which in turn is supported in a bore of the frame 1 and supports the housing or frame 19 thereon. Spiral teeth 43 have been cut in the end of the shaft 4 and stand in mesh with a gear 41 which is fastened to one end of a slotting saw spindle 42. The spindle is journaled in a bushing 44 fitting slidingly in a bore of the housing 19. A pin 45 is pressed into the bushing 44 and enters into a slot 46 of the housing 19 to prevent rotation of the bushing. Axial adjustment of the bushing 44 together with the spindle 42 is effected by a spring 48 whereby a nut 47, which fits on a threaded portion of the bushing is always held against the face of the housing 19. This spring is located in a bore of the housing 19 and rests against a stop collar 49 screwed onto the end of the bushing 44, it being understood that for any adjustment of the bushing the collar 49 and nut on the inner end of the spindle will be turned to permit the bushing and spindle to move axially and relative to the gear 41 without changing the position of the latter with respect to the gear 43. The slotting saw 13 is clamped between a shoulder 50 of the spindle 42 and a cam 51 by a nut 52. Axial adjustment of the bushing effects adjustment of the saw relative to the work held by the carrier 12 whereby perfect alignment of the saw with the axis of the screw to be slotted is readily effected. A guard 53 is fastened to a shoulder of the bushing 44 and is provided with an opening 54. A spring 55 fastened to the guard 53 lies across this opening permitting the saw 13 to pass through a narrow slot when the part to be slotted is pressed against the saw.

The complete drive for the slotting saw is mounted slidably in an axial direction on the tube 40 as will now be described. A rod 56 for regulating the adjustment sideways of the housing, which is required for parts of different length and for varying the depth of the saw cut, fits slidingly with one end in a bore of the frame 1 while the other end is threaded to fit into a tapped hole in a part of the frame 1 on the opposite side of the housing 19. The housing is held axially between a shoulder of the rod 56 and a collar 57 pinned to the reduced part of this rod. A number of radial holes in the collar facilitate turning of the rod. After the housing has been adjusted sideways it is clamped to a face of the frame 1 by a screw 58. A bracket 59 of a bur removing device is fastened to a seat 60 on the housing 19. A swing arm 61 is pivoted on a pin 62 between two lugs of the bracket 59. A slide 63 mounted on this arm 61 carries a shaving tool 64 and a guide 65 both with a slightly tapering shank to fit tightly in their seats. A plate 66 with a nose is fastened to the end of the slide 63 and the nose is held against the cam 51 by a spring 67 thus imparting a reciprocating movement to the slide. A guide pin 68 is screwed through an arm of the bracket 59 with the conical point in line with the guide 65. A spring 69 with adjustable compression exerts a pressure on the swing arm 61 and holds the guide 65 against the guide pin 68, thus causing the shaving tool 64 to perform the same movement as represented by the shape of the guide. When, as shown in the present example, the point of guide pin 68 is sunk into the guide 65 the shaving tool will be reciprocated on an arc conforming to the outline of the head and will remove the bur formed during the previous slotting operation. The screw of course should be moved so as to have the slot in line with the path of the tool. The depth to which the shaving cut can remove metal is governed by the setting of the guide pin 68 which is locked after setting by a nut 70. The removal of the finished pieces is effected by a pin 71 fastened in an arm of the bracket 59.

The operation of the mechanism is as follows: The carrier 12 with a bushing 72 suited to receive the finished part swings until it comes in line with the bar of material in the main spindle 2, an adjustable screw 73 forming a stop, and then moves axially forward to have the bushing 72 receive the part nearly finished. After the cut off has been completed the carrier is rocked by the cam 24 until the part is in line with the slotting saw, a second adjustable screw 74 located in a projection of the housing 19 serving as a stop, and the carrier thereupon is moved gradually in an axial direction by the cam 30 until the required depth has been cut by the slotting saw 13 into the head of the part. The carrier now moves axially in the reverse direction passing by the stop screw 74 and is then turned until the slotted part is in line with the shaving tool 64, a third stop screw 75 fastened in a lug of the bracket 59 limiting this movement. A small axial movement brings the shaving tool into engagement with the slot and the burs are removed in a few strokes. The guide 65 of course is shaped to conform to the shape of the head. After completion of this operation the carrier moves again axially in the reverse direction until the pin 71 pushes the part out of the bushing 72. A small axial movement of the carrier forward again clears the bushing from the pin and the carrier 12 is swung back again by the cam 24 to the starting position. The finished pieces dropping from the carrier are caught in a receptacle not shown.

Having now fully explained my invention I do not wish to be understood as limiting myself to the exact details of construction as obviously many modifications will occur to a person skilled in the art.

What I claim is:

1. In a screw slotting mechanism, a saw, a spindle carrying said saw, a housing within which the spindle is adapted to rotate, a drive for rotating said spindle, including a pair of spiral gears within the housing through one of which the spindle is axially adjustable, means for adjusting said housing in the direction of the axis of one of said spiral gears, and different adjusting means for axially moving said spindle to adjust the saw with respect to the work and yieldable means for maintaining the spindle in adjusted position.

2. In a screw slotting mechanism, a saw, a spindle for carrying said saw, a drive for rotating said spindle, a bushing for said spindle to rotate in, means for adjusting said bushing axially to adjust the same relative to the work, and a spring surrounding said bushing for holding it in the adjusted position.

3. In a screw slotting mechanism, a saw, a spindle for carrying said saw, a drive for rotating said spindle including a driving and a driven spiral gear through the latter of which the spindle is adjustable axially without changing the relative positions of the gears, a housing for said gears, said housing being supported coaxially with said driving spiral gear, and means for adjusting said housing in the axial direction of said driving gear.

4. In a screw slotting mechanism, a slotting saw, a spindle for carrying said slotting saw, a drive for rotating said spindle, a carrier for bringing the cut off pieces from the bar of material to said slotting saw, a cam for causing swinging movements of said carrier, an operating device between the cam and the carrier, another cam for causing axial movements of said carrier, and an adjustable holder for the operating device movable to disengage it from the cam.

5. In a screw slotting mechanism, a slotting saw, a drive for rotating said slotting saw, a carrier for bringing parts otherwise completed from the main spindle to said slotting saw, a member on which said carrier is mounted, a cam for reciprocating said member, a second member for supporting said first member, said first member free to move axially but restrained against turning movement in relation to said second member, and a cam for oscillating said second member.

6. In a screw slotting mechanism, a slotting saw, a drive for rotating said slotting saw, a carrier for moving pieces otherwise finished from the bar of material to said slotting saw, a member on which said carrier is adjustably mounted, a bushing for said member to slide on, means for preventing rotative movements of said member on said bushing, means for oscillating said bushing and different means for reciprocating said member.

7. In a screw slotting mechanism, a slotting saw, a drive for rotating said slotting saw, a carrier for moving parts otherwise completed from the bar of material to said slotting saw, a cam for oscillating said carrier, another cam for reciprocating said carrier, a spring for causing said carrier to follow the rises and depressions of said oscillating cam, and a holder for the spring adjustable to move it to inoperative position.

8. In a screw slotting mechanism, a saw, a drive for rotating said saw, a carrier for bringing pieces otherwise completed from the bar of material to said saw, a member for mounting said carrier on, means for adjusting said carrier on said member, a cam for reciprocating this member, a lever interposed between said cam and said member, a bushing for said member to slide, but not to turn on, a cam for oscillating said bushing, a second lever interposed between said oscillating cam and said bushing, a spring for holding the carrier under control of said reciprocating cam, a second spring for keeping said carrier under control of said oscillating cam, and a housing for said second spring arranged to be swung out of action instantaneously.

9. In turning and screw cutting machines, a slotting saw, a spindle for said slotting saw, a cam also fastened to said slotting saw spindle, a drive for said spindle, a bur removing tool, means for transforming the movement of said cam into a reciprocating movement of said bur removing tool and means for moving the parts to be slotted first into engagement with said slotting saw.

10. In turning and screw cutting machines, a slotting saw, a drive for rotating said saw, a bur removing tool, means for reciprocating said bur removing tool, different means for moving said bur removing tool at right angles to the reciprocating movement to have the path of said tool conform with the shape of the head of the part worked upon and a carrier for moving the parts to be operated upon successively into engagement with said slotting saw and said bur removing tool.

11. In turning and screw cutting machines, a slotting saw, a tool for breaking the edges of the slot produced by said slotting saw, a carrier for said tool arranged to move in two directions, means for moving said carrier back and forth in one direction, and different means for moving said carrier in the other direction.

12. In turning and screw cutting machines, a slotting saw, a bur removing tool, a carrier for said tool forming a slide, a member with suitable ways for guiding said slide, said member being pivoted at one end to permit said tool to perform a second movement at right angles to the movement of said carrier.

13. In turning and screw cutting machines, a slotting saw, a drive for said slotting saw, a tool for removing the burs on the part formed during the slotting operation, means for reciprocating said tool, a former, corresponding in shape to the head of the part and means for guiding said tool in relation to the part in accordance with the shape of said former.

14. In turning and screw cutting machines, a slotting saw, a spindle carrying said saw, a cam secured to said spindle, a drive for rotating said spindle, a bur removing tool, a slide carrying said tool and being under control of said cam, a holder for said slide, a pivot for said holder to oscillate on, a former fastened to said slide, a stationary pin to cooperate with said former, and means for holding said former against said pin.

15. In a machine of the class described, a base, a pair of spaced supports carried by the base, one of which is tubular, a housing carried by said supports, a spindle journaled in the housing and extending transversely of the supports, a gear on the spindle within the housing, a drive shaft projecting through said tubular support, a gear on said shaft within the housing adapted to drive the first mentioned gear and a metal cutting tool on the spindle adapted to be driven thereby.

16. In a machine of the class described, a base, a pair of spaced supports carried by the base, one of which is tubular, a housing carried by said supports, a spindle journaled in the housing and extending transversely of the supports, a gear on the spindle within the housing, a drive shaft projecting through said tubular support, a gear on said shaft within the housing adapted to drive the first mentioned gear, a screw slotting saw on the spindle, a bracket, a tool adjustable upon the bracket for removing burs from the screws and means operated by the spindle adapted to actuate said bur removing tool.

17. In a machine of the class described, a base, a pair of spaced supports carried by the base, one of which is tubular, a housing including a body carried by said supports, said body having a transversely extending portion between the supports, a spindle journaled in said portion, a gear on the spindle within the housing, a drive shaft projecting into said tubular support, a gear on said shaft adapted to drive the first mentioned gear, a metal cutting tool adjacent the outer end of the spindle and means for holding the housing in fixed position upon the supports.

18. In a machine of the class described, a base, a tubular support carried by the base, a housing having a portion sleeved upon the tubular support for adjustment longitudinally thereon, a second support spaced from the first upon which an opposite portion of the housing is adjustably mounted, a bearing carried by the housing, a spindle journaled in said bearing, a metal cutting tool on the spindle, a gear within the housing for driving the spindle, a drive shaft disposed within the said tubular support and a gear thereon adapted to drive the first mentioned gear.

19. In a machine of the class described, a base, a housing carried by the base and having a laterally extending tubular portion, a drive shaft projecting into the housing and having a gear therein, a second gear within the housing meshed with the first mentioned gear, a sleeve within said tubular portion, a spindle journaled in the sleeve and adjustable axially through the second mentioned gear, a collar threaded on the inner end of the sleeve to permit axial adjustment of the latter and forming an abutment for said second mentioned gear, an element adjustable upon the inner end of the spindle and engaging said gear on the opposite side from the collar, means adjustable upon the outer end of the sleeve adapted to engage said tubular portion, yieldable means adapted to urge the sleeve inwardly against the resistance of said tubular housing portion and a metal cutting tool fixed upon the spindle and adapted to rotate therewith.

20. In a machine of the class described, a base, a pair of spaced supports thereon, a housing carried by the supports and having a laterally extending tubular portion projecting at an angle to the horizontal, a spindle journaled in said tubular portion, a screw slotting tool on the outer end of the spindle, a gear within the housing on the inner end of the spindle, a horizontally disposed drive shaft supported by the base on one side of the housing and projecting into the latter transversely to the axis of the spindle and having a gear meshed with the first mentioned gear, a rod carried by the base on the opposite side of the housing from said shaft, a carrier for moving a work piece into position to be slotted by said tool, said carrier being mounted for oscillation and reciprocation upon said rod and means for actuating the carrier.

21. In a machine of the class described, a base, a pair of spaced supports thereon, a housing carried by the supports and having a laterally extending tubular portion projecting at an angle to the horizontal, a spindle journaled in said tubular portion, a screw slotting tool on the outer end of the spindle, a gear within the housing on the inner end of the spindle, a horizontally disposed drive shaft supported by the base on one side of the housing and projecting into the latter transversely to the axis of the spindle and having a gear meshing with the first mentioned gear, a rod carried by the base on the opposite side of the housing from said shaft, a carrier for moving a work piece into position to be slotted by said tool, said carrier being mounted for oscillation and reciprocation upon said rod, means for actuating the carrier, a bracket, a slide thereon, a burring tool upon the slide and means for actuating the burring tool including a member driven by the spindle.

22. In a machine of the class described, a base, a frame supported by the base, a spindle journaled in said frame, a screw slotting tool adjacent the outer end of the spindle, means including a carrier for moving a work piece into position to be slotted by the tool, a burring tool, movable means for supporting the burring tool at one side of the axis of the spindle and operating means for said movable means driven by the spindle.

23. In a machine of the class described, a frame, a spindle journaled thereon, means for driving the spindle, a screw slotting tool upon the spindle, a bracket connected with the frame, a support mounted for a reciprocating and rocking movement upon the bracket, a burring tool carried by the support, means driven by the spindle adapted to actuate the support whereby to move the burring tool in engagement with the screw and means including a carrier for moving the screw into position to be successively operated upon by said slotting and bur removing tools.

24. In a screw slotting machine, a frame, a tubular member supported by the frame, a drive shaft journalled in said tubular member, a spindle holder slidably mounted on said tubular member and extending laterally therefrom, a spindle journaled in said holder, a gear on the inner end of the spindle, a gear on said shaft in driving engagement with the last mentioned gear, a slotting tool on the outer end of said holder, and a support for said holder carried by the frame in spaced relation to said tubular member and including means by which to adjust the holder axially of said drive shaft.

25. In a screw slotting machine, a frame, a tubular support extending from the frame and having one end connected therewith, a spindle journalled in the tubular support, driving means for the spindle, a slotting tool on the outer end of the spindle, a cam mounted on the spindle adjacent the slotting tool, a bracket mounted adjacent the tubular support, a spring pressed slide on the bracket, a burring tool carried by the slide, the latter being actuated in one direction by said cam and means for automatically moving the screws or screw blanks into position to be operated upon by said slotting tool and subsequently moving them to position to be operated upon by said burring tool.

In testimony whereof I affix my signature.

LORENZ K. BRAREN.